(12) United States Patent
Stollman

(10) Patent No.: US 9,715,491 B2
(45) Date of Patent: Jul. 25, 2017

(54) METHODS AND APPARATUS RELATED TO DOCUMENT PROCESSING BASED ON A DOCUMENT TYPE

(76) Inventor: Jeff Stollman, Chesterbrook, PA (US)

(*) Notice: Subject to any disclaimer, the term of this patent is extended or adjusted under 35 U.S.C. 154(b) by 802 days.

(21) Appl. No.: 13/405,993

(22) Filed: Feb. 27, 2012

(65) Prior Publication Data

US 2012/0179961 A1 Jul. 12, 2012

Related U.S. Application Data

(63) Continuation of application No. 12/236,257, filed on Sep. 23, 2008, now Pat. No. 8,126,837.

(51) Int. Cl.
*G06F 17/00* (2006.01)
*G06F 17/27* (2006.01)
*G06F 17/30* (2006.01)

(52) U.S. Cl.
CPC .... *G06F 17/2785* (2013.01); *G06F 17/30893* (2013.01)

(58) Field of Classification Search
CPC ............... G06F 17/30893; G06F 17/2785
USPC ................................. 715/234, 243
See application file for complete search history.

(56) References Cited

U.S. PATENT DOCUMENTS

| | | | |
|---|---|---|---|
| 5,898,836 A * | 4/1999 | Freivald et al. | 709/218 |
| 6,219,818 B1 * | 4/2001 | Freivald et al. | 714/799 |
| 6,549,221 B1 * | 4/2003 | Brown et al. | 715/854 |
| 6,581,039 B2 * | 6/2003 | Marpe et al. | 705/7.29 |
| 6,816,965 B1 | 11/2004 | Moore et al. | |
| 7,249,374 B1 | 7/2007 | Lear et al. | |
| 7,299,504 B1 | 11/2007 | Tiller et al. | |
| 7,308,706 B2 | 12/2007 | Markham et al. | |
| 7,350,226 B2 | 3/2008 | Moriconi et al. | |
| 7,765,271 B1 * | 7/2010 | Bahr et al. | 709/217 |
| 8,112,401 B2 * | 2/2012 | Blackwood et al. | 707/705 |
| 8,126,837 B2 | 2/2012 | Stollman | |
| 8,139,257 B2 * | 3/2012 | Fabrice | G06T 11/60 345/1.1 |

(Continued)

FOREIGN PATENT DOCUMENTS

| | | |
|---|---|---|
| CN | 1392986 A | 1/2003 |
| CN | 1607526 A | 4/2005 |

(Continued)

OTHER PUBLICATIONS

Javacool Software "EULAlyzer™ 1.2 Analyze license agreements for interesting words and phrases" [online], [retrieved on Jul. 11, 2008]. Retrieved from the Internet: <URL: http://www.javacoolsoftware.com/eulalyzer.html>. (2 pgs).

(Continued)

*Primary Examiner* — Stephen Hong
*Assistant Examiner* — Marshon Robinson
(74) *Attorney, Agent, or Firm* — Cooley LLP

(57) ABSTRACT

In one embodiment, a method includes receiving a portion of text from a document. A document type is associated with the document based on at least one of the portion of text or an identifier associated with the document. The method also includes selecting, based on the document type, a document template having a plurality of sections. Each section from the plurality of sections being associated with a document category. At least one section from the plurality of sections including at least one policy preference.

20 Claims, 6 Drawing Sheets

(56) References Cited

U.S. PATENT DOCUMENTS

| | | | |
|---|---|---|---|
| 8,296,214 B1 | 10/2012 | Stollman | |
| 8,713,418 B2* | 4/2014 | King et al. | 715/200 |
| 2001/0042083 A1* | 11/2001 | Saito et al. | 707/517 |
| 2002/0040297 A1* | 4/2002 | Tsiao | G06F 3/16 704/257 |
| 2002/0069060 A1* | 6/2002 | Cannavo | H04M 3/53333 704/257 |
| 2002/0093530 A1* | 7/2002 | Krothapalli et al. | 345/745 |
| 2002/0111792 A1 | 8/2002 | Cherny | |
| 2003/0007397 A1* | 1/2003 | Kobayashi et al. | 365/200 |
| 2003/0046288 A1* | 3/2003 | Severino et al. | 707/10 |
| 2003/0179230 A1* | 9/2003 | Seidman | 345/750 |
| 2003/0212960 A1* | 11/2003 | Shaughnessy et al. | 715/526 |
| 2004/0205342 A1 | 10/2004 | Roegner | |
| 2004/0230572 A1 | 11/2004 | Omoigui | |
| 2005/0065930 A1* | 3/2005 | Swaminathan et al. | 707/6 |
| 2005/0251737 A1* | 11/2005 | Kobayashi et al. | 715/513 |
| 2005/0288939 A1 | 12/2005 | Peled et al. | |
| 2005/0289156 A1* | 12/2005 | Maryka et al. | 707/100 |
| 2006/0224610 A1* | 10/2006 | Wakeam et al. | 707/101 |
| 2006/0271519 A1* | 11/2006 | Blackwood et al. | 707/3 |
| 2006/0288015 A1* | 12/2006 | Schirripa et al. | 707/100 |
| 2007/0022570 A1* | 1/2007 | Lagardere et al. | 715/508 |
| 2007/0133074 A1* | 6/2007 | Fabrice | 358/537 |
| 2007/0143855 A1 | 6/2007 | Gilchrist et al. | |
| 2007/0180471 A1* | 8/2007 | Unz | 725/52 |
| 2007/0208556 A1* | 9/2007 | Kwak | G06F 17/2785 704/9 |
| 2007/0220426 A1* | 9/2007 | Mueller et al. | 715/532 |
| 2007/0245228 A9* | 10/2007 | Lavoie et al. | 715/511 |
| 2007/0268922 A1 | 11/2007 | Dougan et al. | |
| 2008/0080372 A1 | 4/2008 | Cai et al. | |
| 2008/0109871 A1 | 5/2008 | Jacobs | |
| 2008/0141117 A1* | 6/2008 | King et al. | 715/238 |
| 2008/0189599 A1* | 8/2008 | Vasey | 715/234 |
| 2008/0256120 A1* | 10/2008 | Kobayashi et al. | 707/102 |
| 2008/0281841 A1* | 11/2008 | Swaminathan | G06F 17/30011 |
| 2009/0024385 A1 | 1/2009 | Hirsch | |
| 2009/0113351 A1* | 4/2009 | Tomizawa et al. | 715/853 |
| 2009/0306963 A1* | 12/2009 | Prompt et al. | 704/9 |
| 2010/0017194 A1 | 1/2010 | Hammer et al. | |
| 2010/0033754 A1* | 2/2010 | Okita | 358/1.15 |
| 2010/0074524 A1 | 3/2010 | Stollman | |
| 2010/0211905 A1* | 8/2010 | Unz | 715/776 |
| 2010/0332974 A1* | 12/2010 | Thomas | 715/255 |
| 2011/0083070 A1* | 4/2011 | Maryka et al. | 715/234 |
| 2014/0278369 A1* | 9/2014 | Cassimatis | G06F 17/2785 704/9 |

FOREIGN PATENT DOCUMENTS

| | | |
|---|---|---|
| CN | 101046808 A | 7/2013 |
| EP | 1026867 A2 | 8/2000 |

OTHER PUBLICATIONS

Krishna, P. Radha et al., An ER(EC) Framework for e-Contract Modeling, Enactment and Monitoring, Data & Knowledge Engineering, vol. 51, Oct. 2004, pp. 31-58.

Schoop, Mareike, A Language-Action Approach to Electronic Negotiations, Systems, Signs & Actions—An International Journal on Communication, Information Technology and Work, vol. 1, No. 1, 2005, pp. 62-79.

Narendra, Nanjangud C., Generating Correct Protocols from Contracts: A Commitment-Based Approach, 2008 IEEE Congress on Services 2008—Part I, pp. 407-414.

Office Action mailed Jun. 21, 2011 for U.S. Appl. No. 12/236,257.

International Search Report mailed May 10, 2010 for PCT Application No. PCT/US2009/057975.

Chinese Office Action issued Mar. 27, 2014 for Chinese Application No. 200980134231.9.

Chinese Office Action issued Jul. 3, 2013 for Chinese Application No. 200980134231.9.

Chinese Office Action issued Dec. 17, 2013 for Chinese Application No. 200980134231.9.

Chinese Office Action issued Oct. 23, 2012 for Chinese Application No. 200980134231.9.

Chinese Office Action dated Feb. 25, 2016 mailed in corresponding Chinese Application No. 200980134231.9 and English translation thereof.

Chinese Office Action dated Apr. 7, 2017 mailed in corresponding Chinese Application No. 200980134231.9 and English translation thereof.

* cited by examiner

METHODS AND APPARATUS RELATED TO DOCUMENT PROCESSING BASED ON A DOCUMENT TYPE

CROSS-REFERENCE TO RELATED APPLICATION

This application is a continuation of U.S. patent application Ser. No. 12/236,257 filed on Sep. 23, 2008, now U.S. Pat. No. 8,126,837, entitled "Methods and Apparatus Related to Document Processing Based on a Document Type," which is incorporated herein by reference in its entirety.

BACKGROUND

Embodiments relate generally to document processing, and, in particular, to methods and apparatus related to processing of at least a portion of a document based on a document template.

As society becomes more impersonal through such wide-area media as the world-wide web, it has become desirable to formally document rules of engagement between parties providing/using services of one another. This has led to an explosion of contractual documentation (often crafted by the service provider) to which parties must formally or impliedly agree in order to avail themselves of the products and/or services covered by such contracts. The need to approve and reconfirm lengthy and frequently changing documents including End-User-License Agreements (EULAs), Terms and Conditions, and Privacy Policies often poses such an imposition on productivity that many users agree to the terms of such contracts without taking the time to read them and understand the obligations and restrictions imposed by them. Often, users are uncomfortable with this exposure, but take such risks because of the burden of having to read and understand these contracts which can be lengthy and filled with legalese that a typical user may not understand—even if they take the time to read the document in its entirety.

Thus, a need exists for methods and apparatus for processing at least a portion of a document based on a document template.

SUMMARY

In one embodiment, a method includes receiving a portion of text from a document. A document type is associated with the document based on at least one of the portion of text or an identifier associated with the document. The method also includes selecting, based on the document type, a document template having a plurality of sections. Each section from the plurality of sections being associated with a document category. At least one section from the plurality of sections including at least one policy preference.

DETAILED DESCRIPTION

A document analysis engine can be configured to process, in response to a request from a user, a portion of a document based on a document template. Specifically, the document analysis engine can be configured to compare a section of the document template to the portion of the document based on an interpretation of the portion of the document using a parsing function. The parsing function can be configured to interpret the portion of the document based on an ontology and/or a semantic rule. In some embodiments, an action can be performed and/or triggered based on whether the comparison satisfies a threshold condition. Moreover, the document analysis engine can function as a policy filter on behalf of the user by applying policies defined within the document template. In some embodiments, a condition/action combination can be referred to as a policy preference.

In some embodiments, the document template can be customized by a user and/or can be defined based on a master template. In some embodiments, the document template and/or the parsing function can be selected based on an identifier and/or a term associated with the document template. In some embodiments, the document can be associated with target content requested for, for example, viewing by the user.

In some embodiments, the actions performed and/or triggered can be based on a comparison of a document template with a document that is associated with target content. For example, if the document is a contractual document associated with target content requested by the user (e.g., an End-User-License Agreement (EULA) or a privacy policy associated with a web page), the document analysis engine can be configured to determine based on a parsing module and a user-defined template whether or not a specified portion of the document would be acceptable to the user. In some embodiments, the document analysis engine can be configured to identify portions of the document that should be reviewed by the user. In some embodiments, the document analysis engine can be configured to restrict or allow access to the target content based on the analysis of the document.

It is noted that, as used in this written description and the appended claims, the singular forms "a," "an" and "the" include plural referents unless the context clearly dictates otherwise. Thus, for example, the term "a template" is intended to mean a single template or a combination/collection of templates. Also, many of the embodiments are described in connection with processing of contracts by way of example only. Any of the embodiments described herein can be generally applied to the processing (e.g., analysis) of any type of document.

Figure 1:
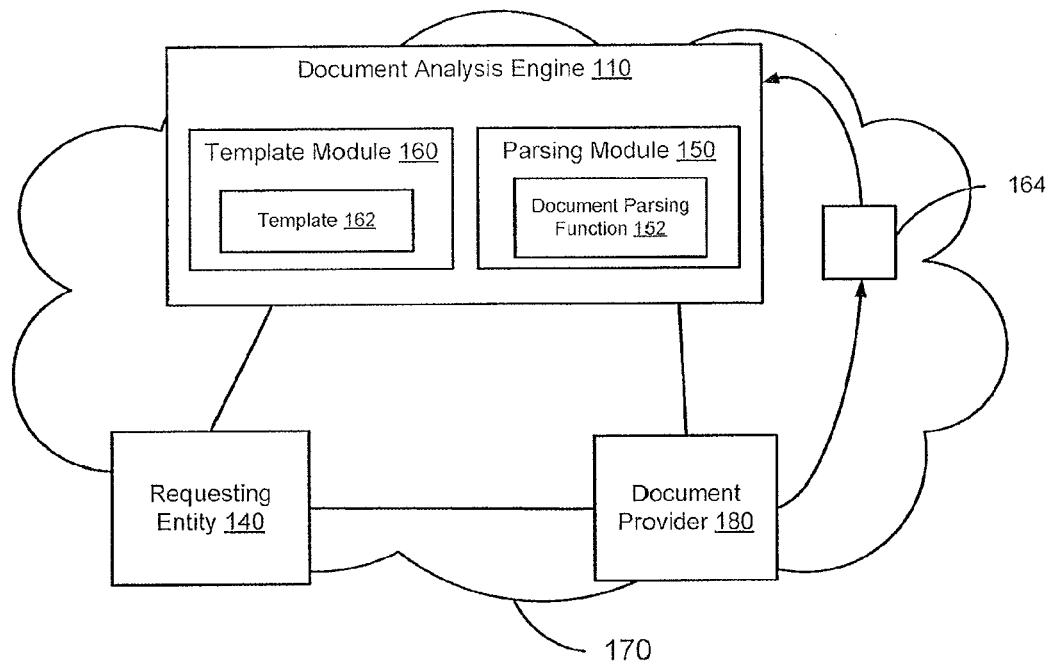
FIG. 1 is a schematic block diagram that illustrates a document analysis engine configured to process a document, according to an embodiment.

FIG. 1 is a schematic block diagram that illustrates a document analysis engine 110 configured to process (e.g., analyze) a document 164, according to an embodiment. The document 164 (or portion of a document) can be delivered to the document analysis engine 110 from a document provider 180 over a network 170 in response to a request from a requesting entity 140 (e.g., a computing entity such as a mobile device, personal computer, or a server that can be controlled a (human) user). Specifically, the document analysis engine 110 can be configured to interpret (and associate an interpretation with) at least a portion of the document 164 using a parsing module 150. The document analysis engine 110 can also be configured to perform (and/or trigger) an action associated with the document 164 based on a comparison of the interpretation (e.g., the meaning) of the portion of the document 164 with one or more sections included in a template 162 using a template module 160. In some embodiments, the interpretation can also be referred to as a meaning.

In some embodiments, the document 164 can be defined based on one or more types of documents such as, for example, a contract (e.g., a lease contract, a EULA, a terms and conditions contract, a real property contract, etc.), a book (e.g., a compilation), an article (e.g., a publication, a journal article, a newspaper article), a user manual, a technical reference document, a compliance report, and so forth. In some embodiments, the document 164 can include text (e.g., digitized text, digitized text acquired from a web page) and/or media (e.g., images (maps, photos, technical drawings, flowcharts, etc.), video, audio). In some embodiments, the document 164 can be processed, for example, by the document analysis engine 110 so that the document 164 can be electronically processed by the document analysis engine 110. In some embodiments, the document 164 can be an entire document (or multiple documents) or a portion of a document (or a portion of multiple documents).

One or more sections within the template 162 used during analysis of the document 164 can include text (e.g., digitized text) and/or media (e.g., images, video, audio). In some embodiments, the sections within a template can be defined so that they correspond with one or more sections associated with the document 164. In some embodiments, the template 162 can include sections that typically appear in a particular type of document identified for analysis using the document analysis engine 110.

In some embodiments, a section within the template 162 can include key words that can be used by the template module 160 during comparison of the section of the template 162 with the document 164. In some embodiments, the key words can be in a particular order and/or can be related according to specified semantic rules.

In some embodiments, the template 162 can included standardized sections and/or customized sections defined by, for example, a user (e.g., the requesting entity 140). In other words, one or more sections of the template 162 can include standardized language adopted by, for example, a governing body or organization. Accordingly, the document 164 can be compared with standardized language included in the template 162.

The parsing module 150 can be configured to interpret (e.g., determine a meaning for, extract a meaning from) the document 164 based on one or more document parsing functions such as document parsing function 152 shown in FIG. 1. Specifically, the document parsing function 152 can be configured to parse at least a portion of text and/or a portion of a media object (e.g., an image, a video, an audio snippet) from the document 164. The document parsing function 152 can be configured to interpret one or more portions, or groups of one or more portions, parsed from the document 164.

In some embodiments, the document parsing function 152 can include, for example, language processing portions (e.g., language processing functional portions) that are defined based on one or more ontological structures and/or one or more semantic rules. The ontological structure(s) and/or the semantic rule(s) included within the language processing portion(s) of the document parsing function 152 can be used by the parsing function to interpret a portion of a document 164. In some embodiments, the interpretation can be based on probabilistic rules (e.g., probabilistic matching with an interpretation) encoded within the document parsing function 152. In some embodiments, the document parsing function 152 can be configured to interpret the document 164 based on natural language processing techniques.

In some embodiments, the document parsing function 152 can include, for example, various tools that can be used by the parsing module 150 to process (e.g., physically process) the document 164. For example, the document parsing function 152 can include an optical character reader (OCR) function that can be used to convert text and/or media included in a paper document into an electronic format that can be processed by the document analysis engine 110. In some embodiments, for example, the document parsing function 152 can include a speech detection/recognition system that can translate propagating sound waves and/or digitized representations of sound waves (e.g., speech, music) to text that can then be processed by the document analysis engine 110.

In some embodiments, the document parsing function 152 of the parsing module 150 can be configured to parse the document 164 (e.g., parse text and/or media included in the document) into sections that correspond with sections included within a template 162. In some embodiments, the document parsing function 152 can be configured to rearrange (e.g., move, combine) portions of the document 164 so that they correspond with sections included within a template 162. In other words, the document parsing function 152 can be configured to prepare the document for comparison with the template 162. In some embodiments, for example, portions of the document 164 can be rearranged by the parsing module 150 based on semantic relationships between words and/or the relationships between sections within the template 162. Accordingly, interpretations can be associated with rearranged portions of the document 164 (e.g., new portions of the document that are defined based on original portions of the document 164 that have been parsed and combined into the new portions). Moreover, the template 162 and the document parsing function 152 can be defined so that they are compatible with (e.g., consistent with, customized for) one another. More details related to parsing functions are discussed in connection with FIG. 4.

One or more sections within the template 162 can be associated with one or more conditions and/or actions that can be performed (triggered) based on whether or not the conditions are satisfied. For example, template 162 can include one or more template sections that can be associated with one or more conditions and/or one or more actions. In some embodiments, the sections of the template 162 and associated conditions/actions can collectively be referred to as a template-policy. In some embodiments, multiple conditions can correspond with an action and/or multiple actions can correspond with a condition. In some embodiments, a condition/action combination can be referred to as a policy preference.

Specifically, one or more actions can be performed (and/or triggered) by the template module 160 based on a comparison of a section of template 162 with the interpretation of a portion of the document 164 by the parsing module 150. For example, the template module 160 can be configured to perform (and/or trigger) an action based on whether or not a comparison of an interpretation associated with a portion(s) of the document with a section within the template 162 satisfies one or more criteria. Although not shown, in some embodiments, the actions performed (and/or triggered) by the document analysis engine 110 can be defined in a database (e.g., a template database) that can be accessed by the template module 160.

In some embodiments, the actions that can be performed (and/or triggered) by the template module 160 in response to a comparison of a portion of the template 162 (e.g., a section) with the interpretation of the document 164 by the parsing module 150 can be, for example, blocking and/or allowing access to (e.g., viewing privileges to, editing privileges to) one or more portions of the document 164 by the requesting entity 140. In some embodiments, the document analysis engine 110 can be configured to identify certain portions of the document 164 that may require further review, for example, by the requesting entity 140. In some embodiments, if the document 164 is a contract, the document analysis engine 110 can be configured to identify one or more terms or sections associated with the contract that should be accepted or rejected. In some embodiments, the document analysis engine 110 can be configured to suggest changes to the document 164 based on the processing of the document 164. In some embodiments, the document analysis engine 110 can be configured to send a notification to, for example, the requesting entity 140 based on the content of the document 164.

In some embodiments, the document analysis engine 110 can be configured to provide an assessment of the document 164 to the requesting entity 140. For example, if the document is a contract, the document analysis engine 110 can identify portions of the document 164 as more restrictive, or less restrictive, than specified sections of the template 162.

In some embodiments, the document analysis engine 110 (e.g., the template module 160 of the document analysis engine 110) can provide options with respect to any of the actions, for example, to the requesting entity 140. In some embodiments, providing an option can be considered (or encoded as) an action. For example, the document analysis engine 110 can be configured to provide options with respect whether or not to block/allow access to a specified portion(s) of the document 164 and/or options with respect to accepting/denying a specified portion(s) of the document 164. In some embodiments, the options (and/or actions) can be accompanied by information defined based on the processing of the document 164 by the document analysis engine 110. For example, one or more options can be accompanied by a highlighted portion and/or an interpretation (e.g., a meaning) of a specified portion(s) of the document 164 as determined by the document analysis engine 110. More details related to conditions and/or actions as related to templates are discussed in connection with FIGS. 3 and 5.

In some embodiments, the template 162 (e.g., sections of the template 162 with associated conditions and/or actions, sections of the template 162 associated with a policy preference) can be defined based on one or more master templates (also can be referred to as master document templates). In some embodiments, the template 162 can be stored in a template database (not shown) where the template 162 can be accessed by the template module 160. In some embodiments, the template 162 can be defined, at least in part, based on one or more preferences of the requesting entity 140 and/or a different entity (not shown) than the requesting entity 140. In some embodiments, the template 162 (or a portion of the template 162) can be applied to only a portion of the document 164 by the template module 160 based a user preference (e.g., a policy, a condition). More details related to templates are discussed in connection with FIGS. 2 through 9.

In some embodiments, the document parsing function 152 (or a portion thereof) and/or the template 162 (e.g., a section with associated conditions and/or actions) can be selected (for use in processing the document 164) based on one or more identifiers and/or one or more terms associated with the document 164. For example, an identifier, such as an electronic tag (e.g., metadata, a link) and/or one or more terms (e.g., a title/heading, a paragraph) associated with one or more portions of the document 164 (e.g., the entire document 164), can be received, interpreted, and used by the document analysis engine 110 to select the document parsing function 152 and/or the template 162 (or template-policy).

The identifier(s) and/or term(s) can be received by the document analysis engine 110 in response to a request from the document analysis engine 110 and/or extracted from one or more portions of the document 164 (and/or data associated with the document 164).

For example, the document parsing functions 152 (or a portion thereof) used by the parsing module 150 and/or the template 162 (or a portion thereof) used by the template module 160 to process the document 164 can be selected based on a document type associated with the document 164 based on analysis of an identifier and/or a term from the document 164. For example, if one or more portions of the document 164 is identified as being defined based on a EULA document type, the parsing module 150 can be configured to determine a meaning of the portion(s) of the document 164 based on a parsing function (such as document parsing function 152) corresponding with a EULA document type. Likewise, the template module 160 can be configured to apply one or more templates (such as template 162) based on the portion(s) of the document 164 being defined based on a EULA document type. In some embodiments, the document analysis engine 110 can be configured to present an option (e.g., an option in a prompt) to the requesting entity 140 (or a different entity) to accept (e.g., confirm) or reject the selection (or portions of the selection) of the template(s) and/or document parsing function(s). In some embodiments, the document analysis engine 110 can be configured so that the requesting entity 140 (or a different entity) can manually make a selection (or override an automatic selection by the document analysis engine 110) of a document parsing function(s) and/or a template(s).

In some embodiments, the identifier(s) and/or the term(s) associated with one or more portions of the document 164 can be received, interpreted, and used during a preliminary processing time period so that the document parsing function 152 and/or a template 162 (or template-policy) can be selected. In other words, the document parsing function 152 and/or the template 162 can be selected from a library of document parsing functions (not shown in FIG. 1) and/or a library of templates (not shown in FIG. 1), respectively, based on analysis of an identifier(s) and/or a term(s) associated with the document 164. In some embodiments, the preliminary processing can be performed based on a default (or generalized) document parsing function (not shown) and/or a default (or generalized) template (not shown). After the document parsing function 162 and the template 152 have been selected, the document parsing function 162 can be used by the parsing module 150 and/or the template 152 can be used by the template module 160 to process the portion(s) of the document 164 during a secondary processing time period.

In some embodiments, processing of the document 164 can be performed in an iterative fashion by the document analysis engine. For example, in some embodiments, analysis of the document 164 by the template module 160 and/or the parsing module 150 can be performed iteratively to refine an analysis of the document 164. In some embodiments, the iterative processing by the template module 160 can be performed based on different templates (not shown) during different iterations. In some embodiments, the iterative processing by the document parsing function 152 can be performed based on different document parsing functions (not shown) during different iterations. In some embodiments, the document parsing functions and/or the templates can be selected based on threshold conditions defined by, for example, the requesting entity 140.

In some embodiments, a first analysis of a document 164 may produce a first level of results (e.g., a hierarchical categorization). A second analysis of the document 164 may produce a second level of results based on or unrelated to the first level of results. The first analysis and the second analysis can be performed by the document analysis engine 110 using different or same templates and/or different or same document parsing functions. In some embodiments, the document analysis engine 110 can be configured to analyze the document 164 multiple times and prompt a user (e.g., the request entity 140) to select one or more of the results of the analysis.

Although not shown in FIG. 1, in some embodiments, the parsing module 150 and/or the template module 160 can apply different document parsing functions (or portions thereof) and different templates (or portions thereof) to different portions of the document 164. For example, if the document analysis engine 110 determines that a first portion of the document 164 corresponds with a EULA (e.g., is a EULA document type) and that a second portion of the document 164 corresponds with a real estate contract (e.g., is a real estate contract document type), the first portion of the document 164 can be processed based on a document parsing function associated with the EULA and the second portion of the document 164 can be processed based on a document parsing function associated with the real estate contract.

In some embodiments, one or more document parsing functions and/or one or more templates can be selected based on a preference of a user such as the requesting entity 140. For example, the user can define a priority preference that can be used by the document analysis engine 110 to select one or more templates over another template, or to select one or more document parsing functions over another document parsing function. In some embodiments, one or more document parsing functions and/or templates can be customized and associated with an identifier associated with the requesting entity 140. In other words, the customized document parsing functions and/or templates can be associated with the requesting entity 140 using the identifier. In response to a request from the requesting entity 140 to process the document 164, the document analysis engine 110 can use the identifier to fetch the customized document parsing functions and/or templates so that the document 164 can be processed based on the customized document parsing functions and/or templates.

In some embodiments, the document 164 can be associated with target content (not shown), and processing of the document 164 can be triggered in response to a request by the requesting entity 140 to access the target content. For example, the target content can be an application that can be downloaded or associated with a webpage (e.g., content included within a webpage), and the document 164 can be a terms and condition contract and/or EULA associated with (e.g., referenced in, linked to) the target content. In some embodiments, one or more portions of the target content can be analyzed in addition to the document 164 (in which case, the target content can be referred to as a document).

Any of the actions and/or options (which can be actions) performed (and/or triggered) by the document analysis engine 110 with respect to the document 164 can be applied to the target content as well. For example, the document analysis engine 110 (e.g., the template module 160 of the document analysis engine 110) can, for example, block and/or allow access (by the requesting entity 140 or a different entity) to one or more portions of the target content based on processing of the document 164. In some embodiments, if the document 164 is a contract, the document analysis engine 110 can be configured to identify one or more terms or sections associated with the contract that could/should be accepted or rejected before the target content is accessed. In some embodiments, the document analysis engine 110 can be configured to send a notification to, for example, the requesting entity 140 about the target content based on the content of the document 164 associated with the target content.

In some embodiments, an identifier and/or term that can be used to select the document parsing function 152 (e.g., select from a library of document parsing functions) and/or the template 162 (e.g., select from a library of templates) can be associated with the target content. For example, the identifier and/or term can be associated with a link (e.g., a hyperlink, a universal resource locator (URL)) (if the target content is a webpage) used to access the target content or included within the target content.

In some embodiments, one or more portions of the document analysis engine 110 can be a hardware-based module (e.g., a digital signal processor (DSP), a field programmable gate array (FPGA)) and/or a software-based module (e.g., a module of computer code, a set of processor-readable instructions that can be executed at a processor (which could be associated with a memory)). In some embodiments, for example, the document analysis engine 110 can be encoded within an application (e.g., a java based application, a web-based application) that can be installed on and/or served to, for example, a personal computer. Any of the operations (e.g., functions) performed by the document analysis engine 110 can be included within one or more modules. For example, one or more operations performed by the parsing module 150 and/or the template module 160 can be combined into a single module or divided in multiple modules (including modules that are not shown).

Although not shown, in some embodiments, the document analysis engine 110 can be made available as a web service. For example, the document analysis engine 110 can be invoked via a web browser. In some embodiments, the document analysis engine 110 can be accessed via an account (e.g., a user account) associated with, for example, a requesting entity. In some embodiments, the functionality associated with the document analysis engine 110 can be made available and invoked via an application programming interface (API).

In some embodiments, any of the operations performed by the document analysis engine 110 can be manually triggered by, for example, the requesting entity 140 (or a different entity). In some embodiments, any of the operations performed by the document analysis engine 110 can be triggered by an entity (not shown) other than the requesting entity 140. For example, the actions and/or options can be presented to an entity different than the requesting entity 140. In some embodiments, one or more portions of templates (such as template 162) and/or document parsing functions (such as document parsing function 152) can be defined by an entity different than the requesting entity 140.

In some embodiments, the document provider 180 can be any entity that can send (e.g., transmit, provide) the document 164 to the document analysis engine 110 for processing. In some embodiments, the document provider 180 can be configured to send the document 164 to the document analysis engine 110 in a format and/or based on a protocol that can be compatibly processed by the document analysis engine 110. In some embodiments, the document analysis engine 110 can have one or more modules configured to convert (e.g., translate) the document 164 into a format (e.g., a protocol) that can be compatibly processed by the document analysis engine 110. In some embodiments, the document provider 180 can be, for example, a wired device and/or a wireless device such as, for example, a computing entity (e.g., a personal computing device), a mobile phone, a personal digital assistant (PDA), and/or a server (e.g., a web server/host).

The network 170 can be, for example, a local area network (LAN) and/or a wide area network (WAN). In some embodiments, the network 170 can include one or more wired and/or wireless segments. Although not shown, the document analysis engine 110, the document provider 180 and/or the requesting entity 140 can be included within a single computing environment (e.g., a personal computer). Although not shown, in some embodiments, a document can be received at a computer via, for example, a universal serial bus (USB) port or a different port (e.g., firewire port). The document can be scanned via a scanner and transmitted to the computer via the USB port. The document can be analyzed by a document analysis engine installed at or accessed from (e.g., via a network) the computer.

In some embodiments, the document analysis engine 110 can be configured to analyze documents that include text and/or images related to various languages and/or cultures. In some embodiments, for example, the document parsing function 152 can be configured to translate one or more portions of the document 164 for comparison with a section of the template 162.

In some embodiments, any portion of the document analysis engine 110 can be configured to allow for, prompt and/or require human interaction (e.g., intervention). For example, the document analysis engine 110 can be configured to prompt a user for approval by the user or manual intervention (e.g., editing, selection) by the user for any action taken by the document analysis engine 110.

Figure 2:
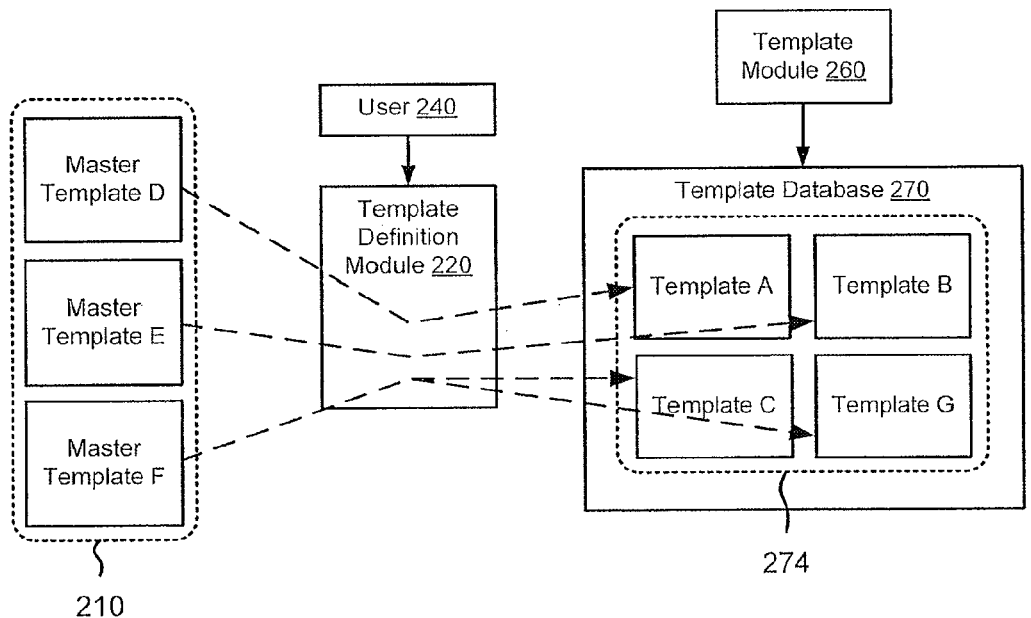
FIG. 2 is a schematic block diagram that illustrates templates defined by a user using a template definition module, according to an embodiment.

FIG. 2 is a schematic block diagram that illustrates templates 274 defined by a user 240 using a template definition module 220, according to an embodiment. The templates 274 can be referred to as a set of templates 274 or as a library of templates 274. The templates 274 are defined based on master templates 210 and, in some embodiments, each of the templates 274 can be referred to as a child template or a customized template. The templates 274 include template A, template B, and template C, and the master templates 210 include master template D, master template E, and master template F. For example, in this embodiment, template A is defined by the user 240 via a template definition module 220 based on master template D. Also, in this embodiment, template C and template G are defined by the user 240 via a template definition module 220 based on master template F. In some embodiments, the user 240 can be a requesting entity. In some embodiments the templates 210 can be referred to as user-specific templates 210.

In this embodiment, the templates 274 are included in a template database 270 that can be accessed by a template module 260. In some embodiments, the template database 270 can be stored in a memory such as a local memory (e.g., a hard drive, a random-access memory (RAM)) and/or a distributed database that can be accessed, for example, via a network.

Each of the templates 274 can include conditions and/or actions (e.g., a policy preference) that can be used by the template module 260 when processing one or more portions of a document (such as document 164 shown in FIG. 1). In some embodiments, the templates 274 can include references (e.g., pointers) back to the master templates 210 (and/or conditions and/or actions included within the master templates 210). In such embodiments, the master templates 210 (and/or associated conditions/actions) can be stored in a location(s) (e.g., at the document analysis engine 110) where they can be accessed by the template module 260 when processing a document.

Although not shown, in some embodiments, the template definition module 220 can be included within a document analysis engine (such as the document analysis engine 110 shown in FIG. 1). Accordingly, the document analysis engine can be used to not only define a template (and associated actions/conditions), but also can be used to process (e.g., analyze) a document based on the template.

Figure 3:
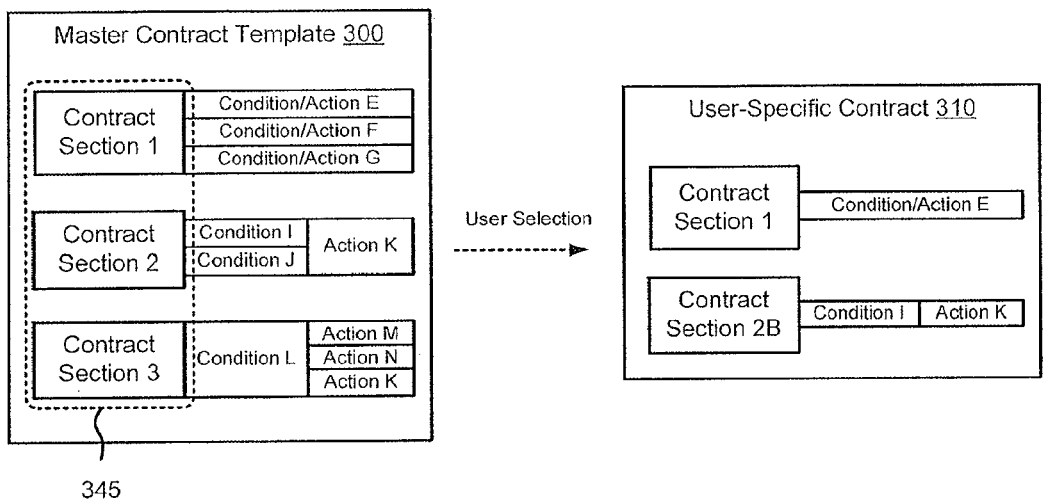
FIG. 3 is a schematic block diagram that illustrates a user-specific contract template defined based on a master contract template, according to an embodiment.

FIG. 3 is a schematic block diagram that illustrates a user-specific contract template 310 defined based on a master contract template 300, according to an embodiment. The master contract template includes three contract sections 345, contract section 1, contract section 2, and contract section 3, that are each associated with various combinations of conditions and actions (policy preferences). Contract section 1 in the master contract template 300 is associated with three different condition/action combinations E, F, and G. Contract section 2 has two conditions—condition I and condition J—associated with a single action K. Contract section 3 has a single condition L associated with three different actions M, N, and K.

The contract sections 345 can include text (e.g., digitized text) and/or media (e.g., images, video, audio) associated with different provisions and/or clauses of a contract. For example, the provisions (which can also be referred to as categories) can include, for example, a severability provision (or clause), a choice of law provision (or clause), a warranty provision (or clause), an indemnification provision (or clause), a confidentiality provision (or clause), and so forth.

As shown in FIG. 3, the user-specific contract template 310 includes a subset of the contract sections 345 and conditions/actions from the master contract template 300. Specifically, the user-specific contract template 310 includes contract section 1, which is associated with condition/action E, and contract section 2B, which is associated with condition I and action K. In this embodiment, contract section 2B is a modified version of contract section 2. Contract section 3 from the master contract template 300 is not included in the user-specific contract policy 310.

As indicated in FIG. 3, the user-specific contract template 310 is defined based on selections by a user from the master contract template 300. In some embodiments, the selections by the user can be performed via a template definition module such as template definition module 220 shown in FIG. 2. In some embodiments, modifying one or more of the contract sections 345 (such as the modification of contract section 2 into contract section 2B) when defining a user-specific contract policy may not be allowed.

In some embodiments, a set of policy preferences (condition/action pairs) can be defined based on a global selection by a user. For example, condition/action E, condition J/action K, and condition L/action M can be selected and used to define a user-specific contract (not shown) based on a single selectable link to this set of policy preferences.

Figure 4:
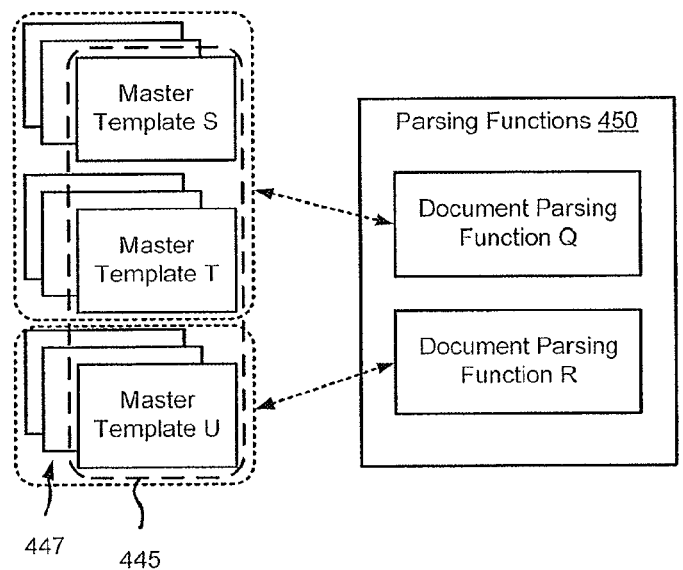
FIG. 4 is a schematic block diagram that illustrates a set of document parsing functions associated with a set of master templates and associated with a set of customized templates, according to an embodiment.

FIG. 4 is a schematic block diagram that illustrates a set of document parsing functions 450 associated with a set of master templates 445 and associated with a set of customized templates 447, according to an embodiment. Each template from the set of customized templates 447 is defined based on at least one template from the set of master templates 445. Document parsing function Q is associated with master template S (and customized templates defined based on master template S) and master template T (and customized templates defined based on master template T), and document parsing function R is associated with master template U (and customized templates defined based on master template U).

In some embodiments, each of the master templates 445 can be defined based on a document type. In some embodiments, the master templates 445 can be defined based on ontologies and/or semantic rules used to define the parsing functions 450. For example, parsing function R and master template U (e.g., sections within the master template U and T), which is associated with parsing function R, can be defined based on ontologies and/or semantic rules defined for processing a EULA. In other words, the document templates (e.g., the master templates 445 and customized templates 447) can be defined so that they are compatible with (e.g., consistent with) the analytical processes encoded within the parsing functions 450. Accordingly, if a document selected for analysis is a EULA, parsing function R and master template U can be used to analyze the EULA.

Figure 5:
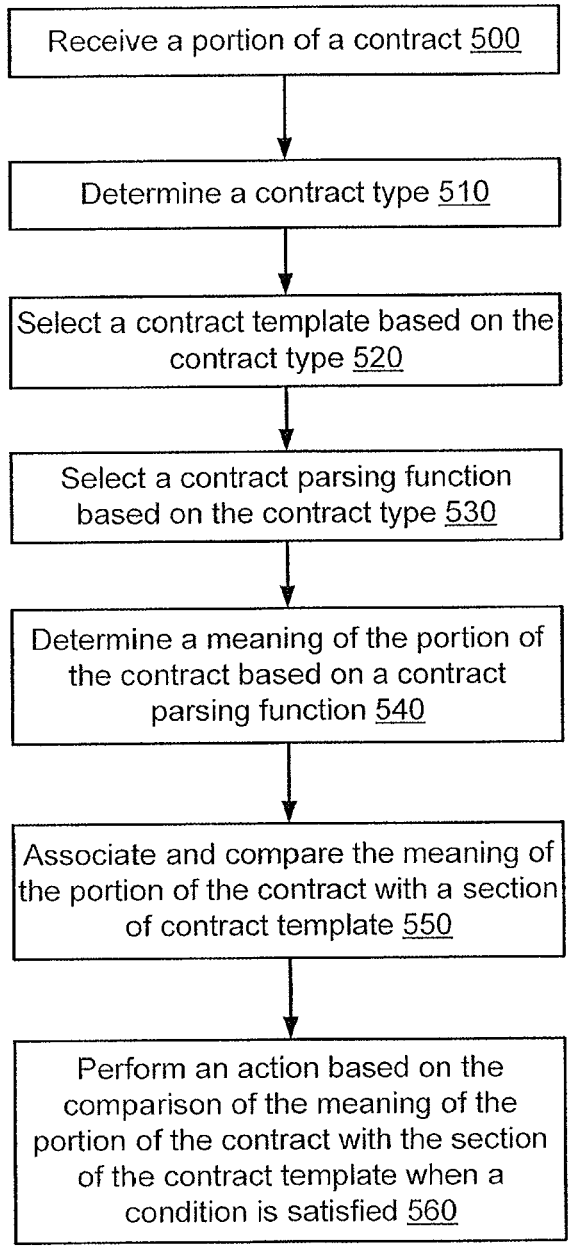
FIG. 5 is a flowchart that illustrates a method for analyzing a portion of a contract based on a contract template, according to an embodiment.

FIG. 5 is a flowchart that illustrates a method for analyzing a portion of a contract based on a contract template, according to an embodiment. In some embodiments, the method can be implemented using, for example, a document analysis engine. As shown in FIG. 5, a portion of a contract is received at 500. The portion of the contract associated with the contract can be received in response to a request from a user (e.g., a requesting entity) and can include text and/or media. The portion of the contract can be associated with, for example, web content served from a web server. In some embodiments, the portion of the contract can be a term within the contract, can be a provision of the contract, can be the entire contract, can be associated with multiple contracts, and so forth.

As shown in FIG. 5, a contract type is determined at 510. In some embodiments, the contract type can be determined based a term (e.g., a single word, a collection of words) and/or based on an identifier associated with the portion of the contract.

If a contract type cannot be determined at 510, an action can be performed and/or triggered. For example, in some embodiments, a user can be notified that the portion of the contract cannot be analyzed. In some embodiments, one or more portions of the portion of the contract can be provided to the user and/or the user can be prompted to make a manual decision with respect to the portion of the contract. In some embodiments, the user can trigger, for example, a document analysis engine to ignore the portion of the contract cannot be analyzed. In some embodiments, the user may not be notified that a contract type could not be determined and/or the portion of the contract can be automatically handled, for example, by a document analysis engine. For example, a document analysis engine can be configured to automatically ignore portions of the portion of the contract that cannot be analyzed.

A contract template is selected based on the contract type at 520. In some embodiments, the contract template can be a contract template defined based on a master contract template. The contract template can include one or more sections that can be associated with conditions and/or actions.

A contract parsing function is selected based on the contract type at 530. In some embodiments, the contract parsing function can be selected based on the contract template that is selected at 520. In other words, a contract parsing function corresponding with the contract template can be automatically selected when the contract template is selected.

In some embodiments, a user can be notified if a contract template and/or a contract parsing function cannot be associated with the portion of the contract. For example, if a contract template for the particular contract type has not been created by the user, the user can be notified that a contract template could not be identified. In such instances, a document analysis engine, for example, can be configured to automatically ignore the portion of the contract, analyze the portion of the contract based on a different contract template (e.g., a default contract template) and/or different contract parsing function (e.g., a default contract parsing function), provide the user with options (e.g., manually triggered options) for handling the scenario (e.g., options for ignoring the portion of the contract, etc.), and so forth.

A meaning for the portion of the contract is determined based on the contract parsing function at 540. In other words, the portion of the contract can be interpreted based on the contract parsing function. If the portion of the contract includes text, the meaning can be determined based on one or more ontologies associated with the contract parsing function and/or one or more semantic rules associated with the contract parsing function. In some embodiments, the one or more ontologies can be defined specifically for the contract type.

The meaning of the portion of the contract is associated and compared with a section of the contract template at 550. The section can be associated with a contractual provision or a contractual term (e.g., a single word that defines a term, a collection of words that define a term).

In some embodiments, if a meaning for at least a portion of the portion of the contract cannot be desirably determined (e.g., determined within a specified threshold accuracy) based on the contract parsing function at 540 and/or the meaning cannot be associated with a section of the contract template at 550, one or more actions can be performed and/or triggered. For example, in some embodiments, a user can be notified of the issue via, for example, a user-interface prompt. In some embodiments, the portion of the contract (or a portion of the portion of the contract) that could not be interpreted can be automatically ignored. In some embodiments, a user can be presented with one or more portions of the portion of the contract that could not be analyzed (e.g., interpreted) and/or can be presented with options (e.g., manually triggered options) for handling the portion of the contract (e.g., options for ignoring the portion of text, etc.). In some embodiments, the portion of the contract can be analyzed based on one or more different contract parsing functions until, for example, a meaning for the portion of the contract can be determined.

An action is performed based on the comparison of the meaning of the portion of the contract with the section of the contract template when at least one condition is satisfied at 560. For example, access to (e.g., viewing privileges to, editing privileges to) one or more portions of content associated with the portion of the contract can be automatically blocked and/or allowed if the comparison of the section of the contract template with the portion of the contract satisfies the condition(s). For example, if the meaning of the portion of the contract is substantially different than the section of the contract template, a user can be notified and/or a change to the portion of the contract can be suggested. In some embodiments, if the meaning of the portion of the contract is substantially different than the section of the contract template, a user can be prevented from viewing content associated with the portion of the contract.

Although FIG. 5 is a flowchart related to analysis of a portion of a contract, in some embodiments, the flowchart can be used to analyze text and/or media that can be associated with different types of documents such as a book or a journal article. In some embodiments, one or more portions of the method can be performed in a different order and/or can require human interaction in order to proceed. For example, in some embodiments, the contract parsing function can be selected based on the contract type (shown at 530) before the contract template is selected based on the contract type (shown at 520). In such instances, the contract template can be selected based on the contract parsing function that is selected. In some embodiments, the contract template must be approved by a user before the contract template is used to analyze one or more portions of the contract.

Figure 6:
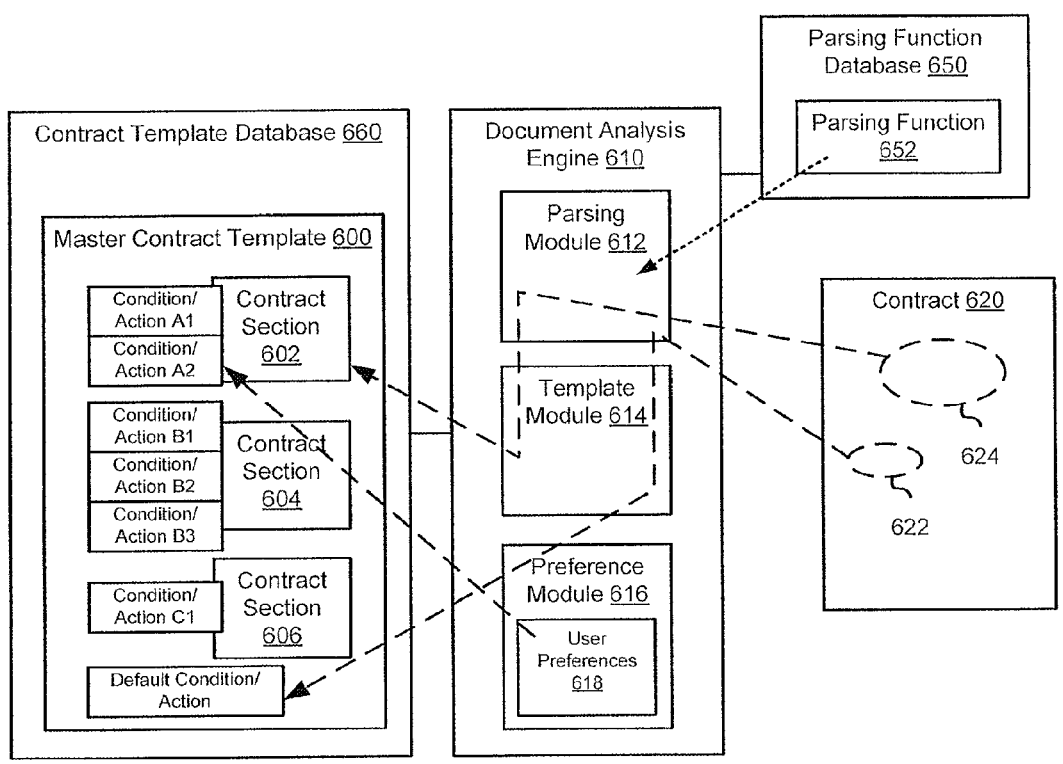
FIG. 6 is a schematic block diagram that illustrates a document analysis engine configured to analyze portions of a contract, according to an embodiment.

FIG. 6 is a schematic block diagram that illustrates a document analysis engine 610 configured to analyze portions of a contract 620, according to an embodiment. Specifically, portion 624 and portion 622 of the contract 620 are analyzed based on a parsing function 652 received from a parsing function database 650, and based on a master contract template 600 from a contract template database 660. The document analysis engine include a parsing module 612, a template module 614, and a preference module 616.

Portion 624 of the contract 620 is interpreted at the parsing module 612 based on parsing function 652. A meaning associated with the portion 624 is compared with contract section 602 of the master contract template 600 using template module 614. As shown in FIG. 6, contract section 602 is associated with two different condition/action combinations—condition/action A1 and condition/action A2. Condition/action A1 is selected from the master contract template 600 based on user preferences 618 applied by the preference module 616. Rather than analyzing the contract 620 based on a customized contract template defined based on a master contract template 600, the contract 620 is dynamically analyzed based on a combination of a master contract template 600 and user preferences 618. In some embodiments, the user preference 618 can be a global preference used to define a set of policy preferences.

Portion 622 of the contract 620 is interpreted at the parsing module 612 based on parsing function 652. In this embodiment, the portion 622 of the contract 620 is not associated with a specific contract section from the master contract template 600. Because a meaning associated with the portion 622 cannot be compared with any of the contract sections included in the master contract template 600, a default condition/action is executed.

Figure 7:
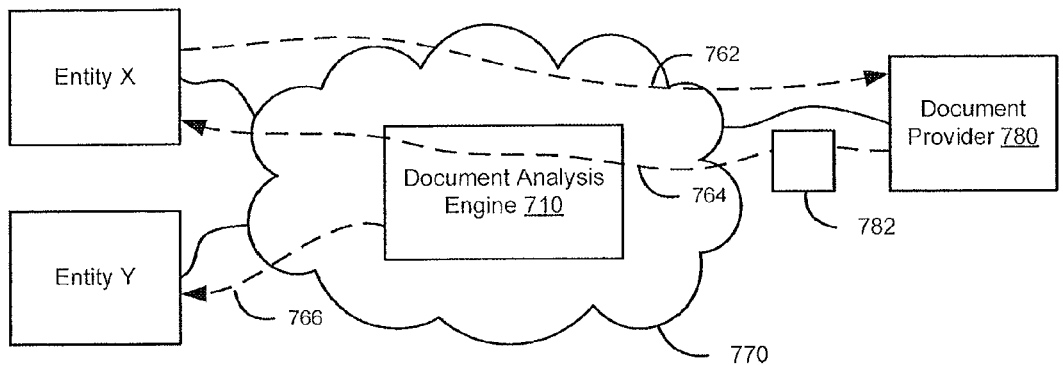
FIG. 7 is a schematic block diagram that illustrates a document analysis engine configured to communicate with a first entity in response to an analysis of a document requested by a second entity, according to an embodiment.

FIG. 7 is a schematic block diagram that illustrates a document analysis engine 710 configured to communicate with a first entity (entity Y) in response to an analysis of a document 782 requested by a second entity (entity X), according to an embodiment. In some embodiments, the document 782 can be a portion of a document. In this embodiment, the analysis of the document 782 at the document analysis engine 710 is triggered in response to a request 762 from entity X. The document 782 is provided to document analysis engine 710 over a network 770 by the document provider 780. In some embodiments, the document analysis engine 710 can be configured to perform/ trigger an action based on the analysis of the document 782.

As shown in FIG. 7, the document analysis engine 710 is configured to send a signal 766 to entity Y in response to the analysis of the document 782 prompted by entity X. In other words the document analysis engine 710 can be configured to send the signal 766 to entity Y even though the analysis of document 782 was triggered by a entity X, which is a different (and/or independent) entity.

In some embodiments, the signal 766 can be related to a notification sent to entity Y based on subscription. In other words, entity Y can subscribe to receive a notification based on a particular event related to a document such as document 782. In some embodiments, the document analysis engine 710 can be configured to perform (and/or trigger) an action (e.g., ignore, accept) with respect to, for example, document 782 as instructed in a subscription. In some embodiments, the action can be performed (and/or triggered) in lieu of or in addition to the signal 766.

For example, in some embodiments, entity Y can register (in a subscription) with the document analysis engine 710 to be notified if a change in document 782 is detected. Signal 766 can be sent to entity Y in response to the document analysis engine 710 detecting a change in document 782 (after being prompted by entity X to analyze the document 782). The change can be detected based on a stored copy (e.g., a cached copy) of the document 782. The signal 766 can include information related to the change (e.g., types of change(s), assessment of the change (more restrictive language, less restrictive language, etc.)). In some embodiments, the document analysis engine 710 can send a notification to entity Y based on a subscription to receive notifications when changes to any document (or portions of any document) of a certain class are detected.

In some embodiments, document analysis engine 710 can be configured to automatically send a signal 766 (e.g., a notification signal) to entity Y when a document (such as document 782) that has previously been requested for analysis by entity Y is later analyzed in response to a request from a different entity such as entity X. Specifically, the document analysis engine 710 can be configured to track (e.g., collect, store) information related to document analysis requests by entity Y, and can use that tracked data (also can be referred to as historical data) to later notify entity Y of changes to documents previously requested for analysis. Accordingly, signal 766 can be a signal generated based on historical data related to documents requested for analysis by entity Y. In some embodiments, the document analysis engine 710 can be configured to notify entity Y when a change has been made to a document previously requested for analysis by entity Y. In some embodiments, the document analysis engine 710 can provide an assessment of the change based on a cached copy of the document. The document analysis engine 710 can be configured to store the tracked data in, for example, a local memory (not shown) and/or a remote database (not shown).

In some embodiments, threshold conditions related to notifications can be defined by entity Y. For example, entity Y can subscribe to receive notifications only when more than a specified percentage of document 782 has changed or only when a specified portion (e.g., set of sections) of the document have change 782. In some embodiments, entity Y can subscribe to receive notifications only when more than a specified percentage of document 782 has changed or only when a specified portion (e.g., set of sections) of the document 782 has changed.

Figure 8:
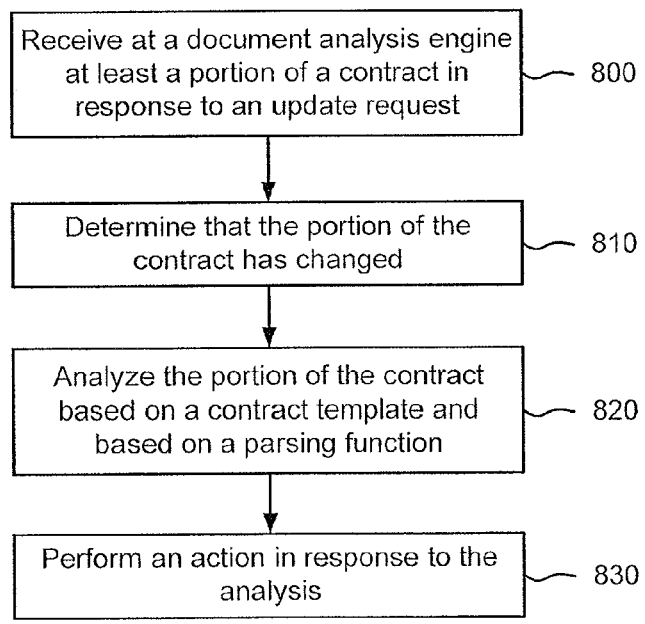
FIG. 8 is a flowchart that illustrates a method for analyzing a portion of a contract in response to an update request, according to an embodiment.

FIG. 8 is a flowchart that illustrates a method for analyzing a portion of a contract in response to an update request, according to an embodiment. As shown in FIG. 8, at least a portion of a contract is received at a document analysis engine in response to an update request. The update request can be a request to determine if a particular document, such as a EULA associated with a particular website, has changed since last analyzed (as indicated in historical data tracked by, for example, a document analysis engine).

At 810, the document analysis engine is configured to determine that the portion of the contract has changed. The change in the document can be determined based on historical data stored at the document analysis engine. For example, in some embodiments, the portion of the contract can be compared with an image (e.g., a copy) of the portion of the contract stored at the document analysis engine (or at a different location by the document analysis engine).

The portion of the contract is analyzed based on a contract template and based on a parsing function at 820. The contract template and/or the parsing function can be retrieved by, for example, the document analysis engine based on a contract type associated with the portion of the contract.

In some embodiments, if a change in the portion of the document is not detected, the document may not be analyzed based on the contract template and/or based on the parsing function. In other words, no action may be taken if a change in the portion of the document is not detected. In some embodiments, for example, the document analysis engine can be configured to log (e.g., record/store a date-time stamp) the processing of the portion of the document and/or cache a copy of the document to build a history for future analysis related to changes to the portion of the document.

An action is performed in response to the analysis at 830. In some embodiments, for example, a user can be notified of details of the differences between the updated portion of the document and the previous image of the portion of the document (or one or more historical copies of the portion of the document). In some embodiments, a user can be prevented from later accessing target content associated with the document based on the analysis. In other words, the analysis can be stored in a memory and used to block access when the target content is later requested.

Figure 9:
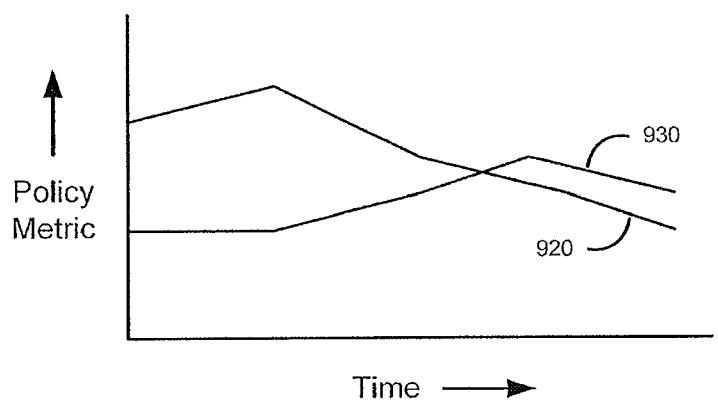
FIG. 9 is a schematic graph that illustrates a trend of two policy metrics versus time, according to an embodiment.

FIG. 9 is a schematic graph that illustrates a trend of two policy metrics—metric 920 and metric 930—versus time, according to an embodiment. The policy metrics can be metrics used to illustrate changes made to a documents over time. For example, policy metric 920 can be related a level of restrictions within a document (e.g., nature of terms within a EULA) over time, and policy metric 930 can be related to a percentage of change (on a word-by-word basis) to a document over time. A document analysis engine can be configured to use historical data related to analysis of one or more documents (e.g., interpretations of the documents) to produce the graph.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave processing systems; and hardware devices that are specially configured to store and execute program code, such as Application-Specific Integrated Circuits (ASICs), Programmable Logic Devices (PLDs), and Read-Only Memory (ROM) and Random-Access Memory devices. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, any of the embodiments which were described in the context of contract analysis can be generally applied to the analysis of any type of document.

What is claimed is:

1. A method, comprising:
   receiving a signal associated with a portion of a document;
   determining a meaning of the portion by interpreting a concept represented by text within the portion;
   selecting a document template based on the portion, the document template being associated with at least one document type;
   preparing the portion of the document for comparison with the document template by aligning a section of the portion of the document with the document template;
   analyzing the meaning with respect to a condition associated with the at least one document type based on a policy preference associated with the document template, the policy preference including an indication of the condition and an indication of a recommendation associated with the condition; and
   sending the indication of the recommendation to an entity in response to the meaning satisfying the condition.

2. The method of claim 1, wherein the determining is based on an identifier associated with the document.

3. The method of claim 1, further comprising:
associating the document with the at least one document type based on at least one of the portion or an identifier associated with the document.

4. The method of claim 1, wherein the receiving includes receiving in response to a request to access content associated with the document.

5. The method of claim 1, wherein the recommendation is associated with at least one of a selection of the portion of the document for review, an acceptance of at least one term or section of the portion of the document, or a rejection of at least one term or section of the portion of the document.

6. The method of claim 1, wherein the determining is based on at least one of an ontology or a set of semantic rules.

7. The method of claim 1, wherein the recommendation is a first recommendation and the condition is a first condition, the method further comprising:
sending an indication of a second recommendation to the entity in response to the meaning satisfying a second condition associated with the at least one document type.

8. The method of claim 1, wherein the document template is at least one of a privacy-related contract template, an end-user-license agreement template, a terms and conditions contract template, a lease contract template, a real property contract template, an article template, a book template, a user manual template, a technical reference document template or a compliance report template.

9. The method of claim 1, wherein the recommendation is a recommendation to accept or reject at least one term or section of the portion of the document.

10. A non-transitory processor-readable medium storing code representing instructions to be executed by a processor, the code comprising code to cause the processor to:
receive a signal associated with a portion of text from a document;
associate a document type with the document based at least in part on the signal;
select, based on the document type, a document template having a plurality of sections, at least one section from the plurality of sections being associated with at least one policy preference used to analyze a meaning of the portion of text by interpreting a concept represented by text within the portion of text;
prepare the portion of text for comparison with the document template by aligning the at least one section with the portion of text;
analyze the meaning of the portion of text with respect to a condition associated with the document type based on the at least one policy preference, the at least one policy preference including an indication of the condition and an indication of a recommendation associated with the condition; and
send the indication of the recommendation to an entity in response to the meaning satisfying the condition.

11. The non-transitory processor-readable medium of claim 10, wherein the at least one policy preference associated with the document template is at least one of a global policy preference, a user policy preference, or a default policy preference.

12. The non-transitory processor-readable medium of claim 10, further comprising:
determine the meaning for the portion of text from the document based on at least one of an ontology or a set of semantic rules associated with the document type; and
associate the portion of text from the document with the at least one section from the plurality of sections based on the meaning.

13. The non-transitory processor-readable medium of claim 10, further comprising:
determine the meaning for the portion of text from the document; and
send an indicator to the entity when the portion of text from the document is not associated with at least one section from the plurality of sections.

14. The non-transitory processor-readable medium of claim 10, wherein the code to cause the processor to receive includes code to cause the processor to receive the signal in response to a request to access content associated with the document, the code further comprising code to cause the processor to:
block transmission of at least a portion of the content based on the analyzing.

15. The non-transitory processor-readable medium of claim 10, wherein the code to cause the processor to receive includes code to cause the processor to receive the signal in response to a request to access content associated with the document; and
the code to cause the processor to select includes code to cause the processor to select based on a transactional valuation associated with the content.

16. The non-transitory processor-readable medium of claim 10, wherein each section from the plurality of sections is associated with a document category.

17. The method of claim 1, wherein the recommendation includes a suggested modification to the document.

18. The non-transitory processor-readable medium of claim 10, wherein the condition is a first condition, the at least one policy preference includes an indication of a second condition and an indication of an action associated with the second condition, the code further comprising code to cause the processor to:
perform the action when the meaning of the portion of the text meets the second condition.

19. The non-transitory processor-readable medium of claim 10, wherein the recommendation includes a suggestion to modify the portion of text.

20. The non-transitory processor-readable medium of claim 10, wherein the condition is a first condition, the at least one policy preference includes an indication of a second condition and an indication of an action associated with the second condition, the action includes automatically accepting or rejecting at least one term or section of the portion of text, the code further comprising code to cause the processor to:
perform the action when the meaning of the portion of the text meets the second condition.

* * * * *